UNITED STATES PATENT OFFICE 2,518,706

CELLULOSE ESTERS OF SULFAMIC ACIDS

John W. Mench, Rochester, N. Y., assignor to Eastman Kodak Company, Rochester, N. Y., a corporation of New Jersey No Drawing. Application January 21, 1948, Serial No. 3,553

18 Claims. (Cl. 260—215)

This invention relates to cellulose esters of sulfamic acids and their preparation by reacting upon cellulose or partially hydrolyzed cellulose derivatives with substituted sulfamyl halides in the presence of a tertiary organic base.

There has been considerable interest in the preparation of cellulose derivatives exhibiting water solubility. For instance, the lactic acid esters of cellulose were developed to supply this need. Subsequently, Fordyce found that if cellulose acetates were hydrolyzed to the proper extent, water solubility was obtained which discovery formed the basis of his Patent 2,129,052. Malm and Waring found that the cellulose esters of dicarboxylic acids, such as phthalic acid, could be converted into alkali metal salts thereof which were water soluble as described in their Patent 2,093,463. Kenyon and Yackel discovered that when cellulose was treated with $NO_2$ under the proper conditions that a carboxyl content was imparted thereto and the resulting cellulose derivative was capable of forming alkali metal salts which were soluble in water, this subject matter being described in their Patent 2,232,990.

An object of my invention is to provide a new type of cellulose compound, most of the members of which exhibit water solubility. Another object of my invention is to provide cellulose compounds the water solubility of which is maintained even under strictly alkaline or acid conditions. A further object of my invention is to provide cellulose compounds having sulfamyl groups therein. Other objects of my invention will appear herein.

I have found that cellulose or partially hydrolyzed cellulose derivatives readily react with substituted sulfamyl halides and that compounds may be prepared therefrom which are either water soluble or water susceptible. I have found that the water-soluble materials thus prepared are useful as film formers, filaments, sizing agents, protective colloids, stripping films, and any other uses in which water-soluble cellulose derivatives may be employed.

In its broadest aspects my invention comprises the treatment of cellulose or a partially hydrolyzed cellulose derivative using substituted sulfamyl halide, such as dimethylsulfamyl chloride, in the presence of a tertiary organic base. The compounds in which I am particularly interested are those having at least .1 sulfamyl group per $C_6$ cellulose unit. The reaction is preferably carried out at a temperature within the range of 20–150° C., the lower temperatures necessitating longer reaction times. The water solubility of the products which are obtained depends both on the hydroxyl and the sulfamyl contents of the products obtained in accordance with my invention. The products, especially those which tend toward water solubility, are separated from the reaction mass by precipitating in a non-solvent therefor, alcohol being ordinarily used in the case of the water-soluble compounds. Some of the sulfamyl esters of cellulose do not exhibit water solubility. However, these derivatives are more readily soluble in aqueous solvents than is the starting material employed.

The sulfamyl halides used may have either lower alkyl (methyl, ethyl, propyl or butyl) substituents or aryl substituents thereon. The aryl or alkyl groups may be either unsubstituted or substituted with substituents such as chlorine, alkyl, $NO_2$, or $NH_2$. Ordinarily, the chloride will be employed due to its commonness. However, other halides are useful in the preparation of sulfamic acid derivatives of cellulose in accordance with my invention. It is necessary that a tertiary organic base, such as pyridine, quinoline, α-picoline, or dimethylaniline, be present in the reaction mass. Ordinarily, where higher esterification temperatures are used, such as at or above the boiling point of the tertiary base employed, obviously the reaction should be carried out in an enclosed vessel or some other means be taken to conserve the pyridine which will otherwise be driven off by the reaction. It is desirable in processes in accordance with my invention that the cellulose compound employed as the starting material have available hydroxyl groups, the invention involving the esterification of those hydroxyl groups by means of the sulfamyl halide under the influence of the organic base which is employed in the mass.

The cellulose derivatives which may be employed as the starting material in my process are any of the well-known starting materials for esterification processes. The cellulose material used as the starting material may be either an ordinary esterification grade cellulose, such as refined cotton linters or high alpha-cellulose acetylation grade woodpulp, or it may be a partially hydrolyzed cellulose derivative, such as partially hydrolyzed cellulose acetate, acetate-propionate or acetate-butyrate, or it may be a cellulose ether having a considerable hydroxyl content.

The following examples illustrate my invention:

*Example 1.*—100 parts of a partially hydrolyzed cellulose acetate having an acetyl content of 38.5% were dissolved in 500 parts of pyridine and 50 parts of dimethylsulfamyl chloride were added. The mixture was heated on a steam bath with stirring for 4½ hours, following which it was diluted with 800 parts of 50% alcohol and precipitated into distilled water. The product was washed and dried and upon analysis was found to contain about 1% of sulfur, thus showing that about 0.08 dimethylsulfamyl group was present per glucose unit. The derivative obtained was found to be soluble in water and acetone.

Example 2.—100 parts of a hydrolyzed cellulose acetate having an acetyl content of 34.9% were dissolved in 500 parts of pyridine and 75 parts of dimethylsulfamyl chloride were added. The mixture was stirred while heating for two hours on a steam bath. It was then diluted with 300 parts of distilled water and precipitated into alcohol. The product was washed with alcohol and dried and was found to contain 4.6% of sulfur, equivalent to 0.42 dimethylsulfamyl group per glucose unit. The product exhibited borderline water solubility.

Example 3.—20 parts of partially hydrolyzed cellulose acetate having an acetyl content of 31.1% were dissolved in 150 parts of pyridine and 50 parts of dimethylsulfamyl chloride were added. The mass was heated on a steam bath for eighteen hours with stirring and was then diluted with 50 parts of distilled water and precipitated into alcohol. The product was then washed with alcohol and dried and upon analysis was found to have 6.7% sulfur, indicating .63 dimethylsulfamyl group per glucose unit. This product was readily water soluble.

Example 4.—100 parts of partially hydrolyzed cellulose acetate having an acetyl content of 31.1% were dissolved in 500 parts of pyridine and 100 parts of dimethylsulfamyl chloride were added thereto. After stirring the mixture on a steam bath for one hour it was diluted with 250 parts of distilled water and was then precipitated by pouring into alcohol. The product was washed with alcohol and dried and contained 3.8% of sulfur indicating .32 dimethylsulfamyl group per glucose unit. This product was readily water soluble.

Example 5.—50 parts of hydrolyzed cellulose acetate having an acetyl content of 16.9%, such as prepared by the process described in Fordyce Patent 2,129,052 were mixed with hot pyridine so as to give a gel-like solution, and 103 parts of dimethylsulfamyl chloride were added. The mass was heated on a steam bath with stirring for 2½ hours. It was then diluted with 250 parts of distilled water and precipitated into alcohol. After washing with alcohol and drying, the product was found to have 7.8% of sulfur or .64 dimethylsulfamyl grouping per glucose unit. This product was readily water soluble.

Example 6.—10 parts of cellulose regenerated from cellulose acetate were heated on a steam bath for eighteen hours in a mixture of 100 parts of pyridine and 50 parts of dimethyl sulfamyl chloride. A gelatinous solution was obtained which was diluted with 75 parts of 33% acetone and precipitated into alcohol. After washing with alcohol and drying, the product upon analysis was found to have 10.2% sulfur equivalent to .78 dimethylsulfamyl group per glucose unit. The product was not soluble in ordinary solvents.

In the above examples instead of dimethylsulfamyl chloride other substituted sulfamyl halides can be employed with equal effectiveness, such as diethylsulfamyl chloride, diphenylsulfamyl chloride, methylethylsulfamyl chloride, or the bromides or iodides corresponding to compounds of this type. It is preferable that the alkyl groups of the sulfamyl chlorides be not greater than butyl groups. Benzyl, or cresyl groups might be present as the substituents of the sulfamyl chloride used. My invention also includes within its scope the use of sulfamyl halides in which the substituents thereon do not correspond, such as phenylchlorphenylsulfamyl chloride. Ordinarily, it is desirable to carry out the reactions in accordance with my invention at a temperature within the range of 80–150° C. due to the rate of reaction being greater at these elevated temperatures. If, however, time is no factor, the reactions can be carried out at lower temperatures requiring longer times of treatment. The products of my invention may be dissolved in suitable solvents and employed in various connections in which cellulose derivatives have been employed heretofore for which these particular compounds are suited. For instance, the water-soluble derivatives might be useful as protective colloids or as sizing agents. The derivatives which are not water soluble, on the other hand, might be employed to prepare films or filaments in the usual manner.

I claim:

1. A cellulose ester of a sulfamic acid containing less than 1 disubstituted sulfamyl group per glucose unit the substituents on the sulfamyl being selected from the group consisting of the lower alkyl and aryl groups.

2. A cellulose ester of a sulfamic acid containing less than 1 dialkyl sulfamyl group per glucose unit the alkyls being of 1–4 carbon atoms.

3. A cellulose ester of a sulfamic acid containing less than 1 dimethyl sulfamyl group per glucose unit.

4. A cellulose ester of a sulfamic acid containing less than 1 diethyl sulfamyl group per glucose unit.

5. A cellulose ester of a sulfamic acid containing less than 1 diaryl sulfamyl group per glucose unit.

6. A cellulose ester of a sulfamic acid containing less than 1 diphenylsulfamyl group per glucose unit.

7. A method of preparing cellulose esters of sulfamic acids which comprises reacting upon a material selected from the group consisting of cellulose and carboxylic acid esters of cellulose, containing free and esterifiable hydroxyl groups with a disubstituted sulfamyl halide the substituents on the sulfamyl being selected from the group consisting of the lower alkyl and aryl groups in the presence of a tertiary organic base.

8. A method of preparing cellulose esters of sulfamic acids which comprises reacting upon a material selected from the group consisting of cellulose and carboxylic acid esters of cellulose, containing free and esterifiable hydroxyl groups with a dialkyl sulfamyl halide the alkyls being of 1–4 carbon atoms in the presence of a tertiary organic base.

9. A method of preparing cellulose esters of sulfamic acids which comprises reacting upon a material selected from the group consisting of cellulose and carboxylic acid esters of cellulose, containing free and esterifiable hydroxyl groups with a dimethyl sulfamyl halide in the presence of a tertiary organic base.

10. A method of preparing cellulose esters of sulfamic acids which comprises reacting upon a material selected from the group consisting of cellulose and carboxylic acid esters of cellulose, containing free and esterifiable hydroxyl groups with a diethyl sulfamyl halide in the presence of a tertiary organic base.

11. A method of preparing cellulose esters of sulfamic acids which comprises reacting upon a material selected from the group consisting of cellulose and carboxylic acid esters of cellulose, containing free and esterifiable hydroxyl groups with a diaryl sulfamyl halide in the presence of a tertiary organic base.

12. A method of preparing cellulose esters of sulfamic acids which comprises reacting upon a material selected from the group consisting of cellulose and carboxylic acid esters of cellulose, containing free and esterifiable hydroxyl groups with a diphenyl sulfamyl halide in the presence of a tertiary organic base.

13. A method of preparing cellulose esters of sulfamic acids which comprises reacting upon a material selected from the group consisting of cellulose and carboxylic acid esters of cellulose, containing free and esterifiable hydroxyl groups with a disubstituted sulfamyl halide the substituents on the sulfamyl being selected from the group consisting of the lower alkyl and aryl groups and pyridine.

14. A method of preparing cellulose esters of sulfamic acids which comprises reacting upon a material selected from the group consisting of cellulose and carboxylic acid esters of cellulose, containing free and esterifiable hydroxyl groups with a dimethyl sulfamyl halide and pyridine.

15. A method of preparing cellulose esters of sulfamic acids which comprises reacting upon a material selected from the group consisting of cellulose and carboxylic acid esters of cellulose, containing free and esterifiable hydroxyl groups with a dimethyl sulfamyl chloride and pyridine.

16. A method of preparing cellulose esters of sulfamic acids which comprises reacting upon a partially hydrolyzed cellulose acetate containing free and esterifiable hydroxyl groups with a disubstituted sulfamyl halide the substituents on the sulfamyl being selected from the group consisting of the lower alkyl and aryl groups in the presence of a tertiary organic base.

17. A method of preparing cellulose esters of sulfamic acids which comprises reacting upon a partially hydrolyzed cellulose acetate containing free and esterifiable hydroxyl groups with dimethyl sulfamyl chloride in the presence of a tertiary organic base.

18. A method of preparing cellulose esters of sulfamic acids which comprises reacting upon a partially hydrolyzed cellulose acetate containing free and esterifiable hydroxyl groups with dimethyl sulfamyl chloride and pyridine.

JOHN W. MENCH.

REFERENCES CITED

The following references are of record in the file of this patent:

Friese et al.: Berichte, vol. 71B, pages 1307–1312 (1938).

Cupery: Ind. & Eng. Chem., vol. 30, pages 627–631 (1938).